P. LARSEN.
CHEESE HOOP FOLLOWER.
APPLICATION FILED DEC. 16, 1915.
1,195,371.
Patented Aug. 22, 1916.
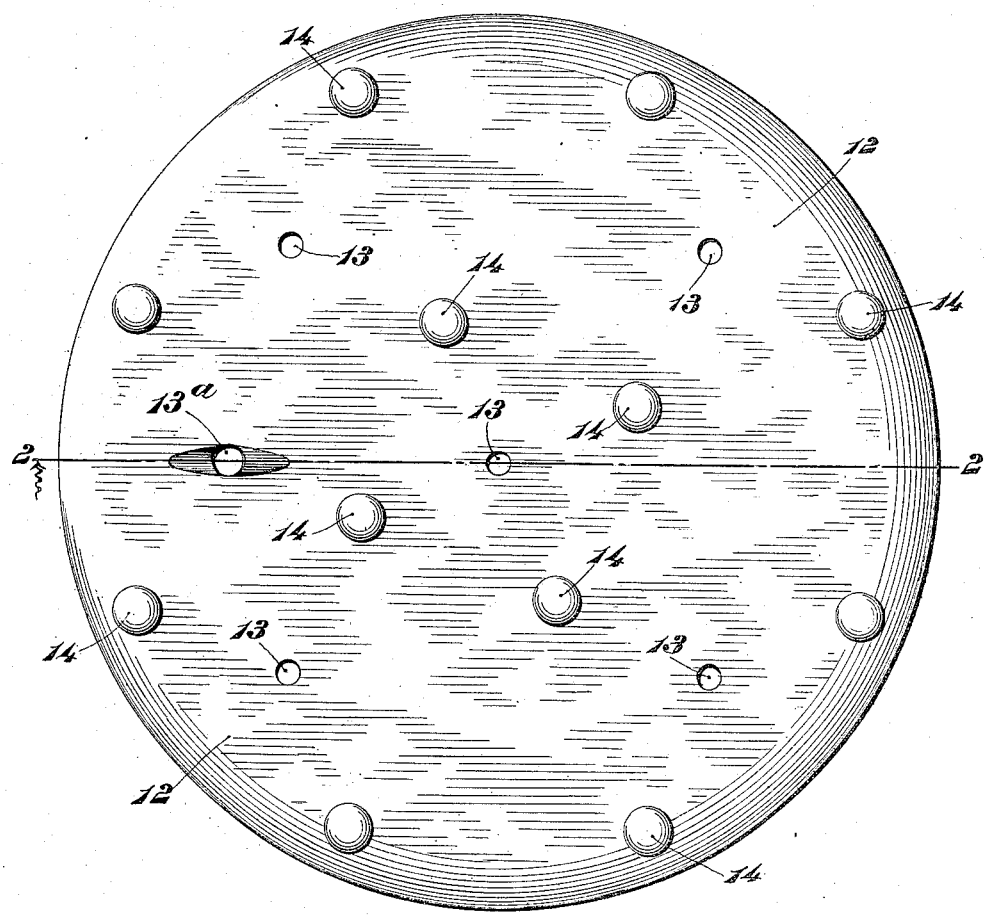
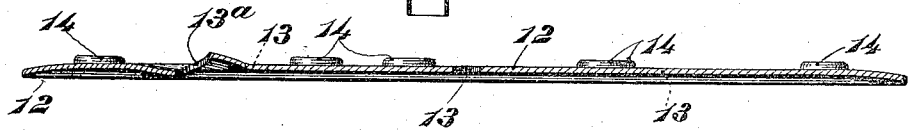

UNITED STATES PATENT OFFICE.

PETER LARSEN, OF CATTARAUGUS, NEW YORK.

CHEESE-HOOP FOLLOWER.

1,195,371. Specification of Letters Patent. Patented Aug. 22, 1916.

Application filed December 16, 1915. Serial No. 67,160.

*To all whom it may concern:*

Be it known that I, PETER LARSEN, a citizen of the United States, residing at Cattaraugus, in the county of Cattaraugus and State of New York, have invented or discovered certain new and useful Improvements in Cheese-Hoop Followers, of which the following is a specification, reference being had therein to the accompanying drawing.

This invention relates to followers for cheese hoops such as are used in gang presses, and the invention has for its object to provide an improved sanitary metal follower adapted to coöperate with well-known forms of cheese hoops now in use, and having plain perforated ends or bottoms, such, for example, as the Fraser cheese hoop.

A cheese hoop follower now largely in use consists of a disk of wood provided with grooves on its outer face and with perforations communicating with these grooves, this follower being used in connection with a packing ring of felt or other similar material to make a close joint at the periphery of the follower. These followers and packing rings are, of course, more or less absorbent and are difficult to cleanse, and therefore soon become foul and unsanitary. This objection is obviated by the present follower consisting of a disk of sheet metal of such a size as to closely fit the interior of the cheese hoop, and preferably having its periphery slightly bent inward so as to crowd the curd toward the center of the cheese hoop, this metal disk being provided with draining perforations and having on one face spacing projections consisting of small metal disks or buttons permanently attached to the follower, preferably by "spot welding", the opposite face of the follower being plain or smooth.

In the accompanying drawing Figure 1 is a plan view of the improved follower, and Fig. 2 a transverse section of the same on line 2—2, Fig. 1.

Referring to the drawing, 12 denotes the body of the follower consisting of a disk of sheet metal preferably having its outer edge slightly bent or inturned, said disk being provided with draining perforations 13. The follower is provided on its outer face with permanently attached projections 14, preferably consisting of small metal disks or buttons fixedly secured thereto by spot welding. The periphery or outer edge of the follower is turned or curved inward away from the face having the buttons or projections, giving the follower a slightly dishing form so that it will have a tendency to crowd the curd inward away from the cheese hoop, and thus avoid the necessity of the use of a packing ring therewith. One of the draining perforations 13$^a$ is preferably formed large enough for the insertion of a hook by which the follower may be removed from the cheese hoop after the pressing operation, the metal adjacent this perforation 13$^a$ being preferably bent slightly inward and outward to facilitate the insertion of the hook. The improved follower will be made in different sizes, to fit different sizes of cheese hoops.

From the foregoing it will be understood that the invention provides a sanitary and easily-cleansed cheese hoop follower of simple construction adapted for use in connection with cheese hoops now in use and having plain perforated bottoms from which the followers will be slightly spaced by the projections or buttons 14. As this improved follower has a plain or smooth inner face, with the exception of the slight projection at the perforation 13$^a$, it will leave the surface of the cheese smooth, or nearly so, and it is therefore very much to be preferred to a disk follower having projections on its lower or inner face which will make indentations in the surface of the cheese; or to a follower having outwardly pressed or stamped ribs or projections the hollow inner sides of which will result in the formation of raised ridges or projections on the surface of the cheese, which is somewhat objectionable.

Having thus described my invention I claim and desire to secure by Letters Patent:

1. A one-piece cheese hoop follower consisting of a perforated disk of sheet metal having permanently attached, spot-welded projections or buttons on one face thereof, and having a plain or smooth opposite face.

2. A one-piece cheese hoop follower consisting of a perforated disk of sheet metal having permanently attached projections or buttons on one face thereof, and having a plain or smooth opposite face.

3. A one-piece cheese hoop follower consisting of a perforated disk of sheet metal having permanently attached projections or buttons on one face thereof, and having a plain or smooth opposite face, the periphery or outer edge of said follower being slightly bent inward away from the face having said projections or buttons, thus giving the follower a slightly dishing form which will have a tendency to crowd the curd inward.

In testimony whereof I affix my signature.

PETER LARSEN.

Copies of this patent may be obtained for five cents each, by addressing the "Commissioner of Patents, Washington, D. C."